United States Patent [19]

Goldmann

[11] Patent Number: 4,576,644
[45] Date of Patent: Mar. 18, 1986

[54] METHOD OF PRODUCING CEMENT FROM RAW MATERIAL CONTAINING HARMFUL SUBSTANCES

[75] Inventor: Wolf Goldmann, Beckum, Fed. Rep. of Germany

[73] Assignee: Krupp Polysius AG, Beckum, Fed. Rep. of Germany

[21] Appl. No.: 551,677

[22] Filed: Nov. 14, 1983

[30] Foreign Application Priority Data

Nov. 30, 1982 [DE] Fed. Rep. of Germany ....... 3244241

[51] Int. Cl.$^4$ .............................................. C04B 7/02
[52] U.S. Cl. .................. 106/100; 106/103; 432/13; 432/106
[58] Field of Search ................. 106/100, 103; 432/13, 432/14, 106

[56] References Cited

U.S. PATENT DOCUMENTS 4,286,993  9/1981  Lovichi et al. ..................... 106/100
4,329,180  5/1982  Herchenbach et al. ............ 106/100

Primary Examiner—William R. Dixon, Jr.
Assistant Examiner—Ann Knab
Attorney, Agent, or Firm—Learman & McCulloch

[57] ABSTRACT

A method of producing cement from raw material containing a harmful substance such as sulphur, alkali and/or chlorine. In order to reduce the circulation of harmful substances a proportion of the gas or material stream is extracted from a zone in the cyclone preheater at which the desired reduction in the content of the harmful substance is achieved with minimum heat loss.

8 Claims, 5 Drawing Figures

METHOD OF PRODUCING CEMENT FROM RAW MATERIAL CONTAINING HARMFUL SUBSTANCES

BACKGROUND OF THE INVENTION

The invention relates to a method of producing cement from raw material containing harmful substances such as sulphur, alkali, or chlorine.

In rotary kiln production of cement from raw material containing sulphur the sulphur can be present in the following compounds:

$CaSO_4.2H_2O$ (gypsum)
$CaSO_4$ (anhydrite)
$MgSO_4.2H_2O$
$BaSO_4$ (barium sulphate)
$FeS_2$ (pyrite, marcasite)
$PbS$ (lead sulphide)
$ZnS$ (zinc blende)
organic compounds In all cases the effect of heat causes $SO_2$ to be produced from these compounds; for example, in accordance with the formula $$4FeS_2 + 11O_2 = 2Fe_2O_3 + 8SO_2$$

or $$CaSO_4 = CaO + SO_2 + \tfrac{1}{2}O_2$$

Alkali sulphate is formed in the gaseous atmosphere of the rotary kiln from the $SO_2$ which is present in gaseous form and the vaporized alkali oxide which is also present in the gaseous atmosphere and by absorbing oxygen in accordance with the following:

$$Na_2O + SO_2 + \tfrac{1}{2}O_2 = Na_2SO_4$$

$$K_2O + SO_2 + \tfrac{1}{2}O_2 = K_2SO_4$$

If the alkali content in the gaseous atmosphere of the rotary kiln is too low to fix all the $SO_2$, then calcium sulphate is produced in the hotter zones of the rotary kiln in accordance with:

$$CaO + SO_2 + \tfrac{1}{2}O_2 = CaSO_4$$

Finally, if there is a further excess of $SO_2$ a reaction with the $CaCO_3$ occurs in the rotary kiln and in the preheater according to the following:

$$CaCO_3 + SO_2 + \tfrac{1}{2}O_2 = CaSO_4 + CO_2$$

The alkali sulphates condense in the less hot zones of the rotary kiln and in the preheater on the material to be burnt and return to the sintering zone together with the calcium sulphate formed in the material to be burnt. A small quantity of $SO_2$ is discharged with the gas leaving the preheater. However, the greater proportion is returned to the sintering zone in the manner described. There most of the sulphur in the form of $SO_2$ is converted to the gaseous phase and travels with the kiln gas countercurrent to the material. Depending upon the volatility, only a proportion of the sulphur is discharged with the clinker.

Thus, when raw material containing sulphur is used a significant sulphur circulation occurs in the apparatus and this can lead to considerable problems with deposits especially in the inlet region of the rotary kiln. In order to avoid disruption of operation it has been attempted to reduce the sulphur circulation by extracting a proportion of the sulphur-containing gas stream from the apparatus. In the past this was done by causing part of the kiln exhaust gas stream to be branched off after it had left the rotary kiln (i.e., before entering the lowest stage of the cyclone preheater). This procedure also is followed when a specific sulphur content in the clinker must not be exceeded.

Similar problems occur in the production of cement from raw materials containing alkali and/or chlorine. Here too attempts have been made in the past to reduce an undesirable alkali or chlorine circulation by extracting part of the kiln exhaust gas stream (bypass stream) after it had left the rotary kiln.

SUMMARY OF THE INVENTION

An object of the invention is to develop further the methods referred to in such a way that the desired reduction in the content of harmful substances (i.e., the reduction of the sulphur, alkali, or chlorine circulation) is achieved with optimum heat loss, construction, and operating costs.

The method according to the invention is based upon the recognition that the type of bonding of the harmful substance contained in the raw material is crucial when deciding at what temperature and at what location in the apparatus the harmful substances are to be released. Thus, in raw material containing pyrite the oxidation of the sulphur takes place at approximately 400°–600° C., while the $SO_2$ is produced from the calcium sulphate at approximately 900°–1000° C. Depending upon the type of raw material and the type of sulphur compound in the raw material the maximum sulphur concentration thus occurs in the gas or in the material at different zones in the apparatus. As a result the extraction of part of the kiln exhaust gas stream between the rotary kiln and the lowest cyclone stage, which was used in the past, has not proved to be ideal in many cases. By contrast, and according to the invention, the branch stream of gas or material containing the harmful substances is extracted at a zone with high concentration of harmful substances but the lowest possible temperature. In addition, the particular construction and operating costs can be taken into account in the selection of the extraction zone.

DESCRIPTION OF THE DRAWINGS

The foregoing and further details of the invention are disclosed in the following description of several embodiments illustrated in the drawings, wherein.

DETAILED DESCRIPTION

Figure 1:
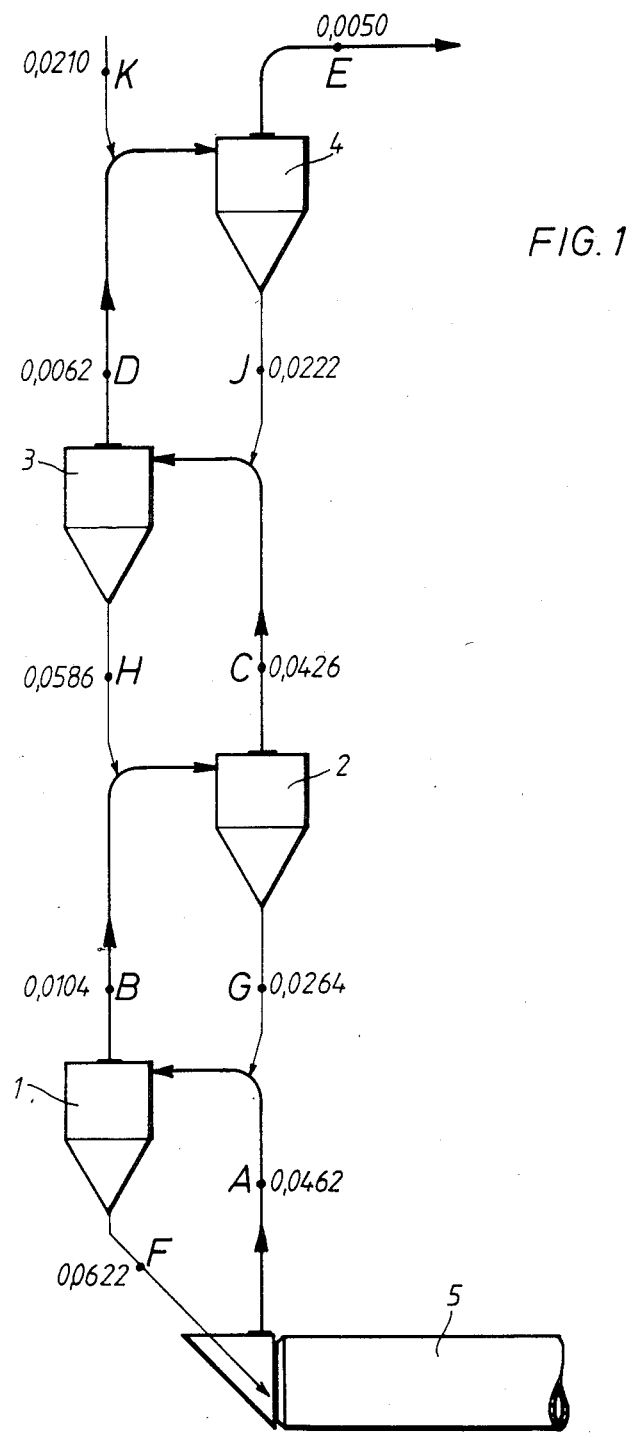
FIGS. 1–5 are schematic illustrations of the same apparatus used in the extraction of harmful substances from five different kinds of raw materials.

FIG. 1 schematically illustrates apparatus having a four-stage cyclone preheater containing four cyclones 1, 2, 3, and 4 and a rotary kiln 5. These parts of the apparatus are connected to each other in a known manner by means of their gas and material ducts, and the exhaust gases from the rotary kiln 5 pass in succession through the cyclones 1, 2, 3, and 4 of the cyclone preheater while the raw material passes in counterflow to the gas successively through the cyclones 4, 3, 2, 1 before it enters the rotary kiln 5 via its inlet.

It should now be assumed that the apparatus according to FIG. 1 is supplied with raw material containing pyrite. If the quantities of sulphur (expressed in kg $SO_3$/kg clinker) occurring at the individual zones of the preheater in the gas and material stream are determined then the numerical values shown in FIG. 1 are produced. The values at zones A, B, C, D, and E relate to the sulphur content of the gas stream and the values at zones F, G, H, J, and K relate to the sulphur content of the material.

If a proportion of the kiln exhaust gas stream is to be extracted in the usual way at zone A, then approximately 0.00046 kg $SO_3$/kg clinker would be drawn off here per 1% bypass gas (based on the quantity of gas at the inlet to the rotary kiln). Since the temperature of the gas at this zone can be 1000°–1200° C., and highly deacidified material is removed with the gas, this means a heat loss of approximately 25–35 kJ/kg clinker per 1% bypass gas.

According to the invention, however, there are two alternatives for a more economical solution: First, if the sulphur circulation is reduced by extracting part of the gas stream, then this bypass stream is advantageously extracted at the zone C, i.e., after or downstream from the second lowest cyclone stage 2. At this zone, downstream from zone A, the highest sulphur concentration is to be found in the gas stream. However, since the gas temperature here is only approximately 600° C., there is only a heat loss of approximately 17 kJ/kg clinker per 1% bypass gas.

Second, if the sulphur circulation is reduced by extracting a proportion of the sulphur-containing material stream, then this branch stream is advantageously taken off at zone H, i.e., downstream from the third cyclone stage from the bottom (cyclone 3). At this zone there is a slightly lower sulphur concentration than at zone F, but the material temperature is considerably lower. With the same reduction of the sulphur circulation by approximately 0.00046 kg $SO_3$/kg clinker, this means a heat loss of only approximately 7 kJ/kg clinker. Four times as much material is rejected by comparison with the aforementioned alternative (with the gas extraction and loss of material contained in the extracted gas), and the additional grinding costs are lost. On the other hand, savings are made on investment and maintenance of a filter for disposal of the gas such as is necessary in the first alternative.

By comparison with the known methods the sulphur circulation is more greatly decreased and the heat loss considerably reduced in the case of both alternatives in the method according to the invention.

Figure 2:
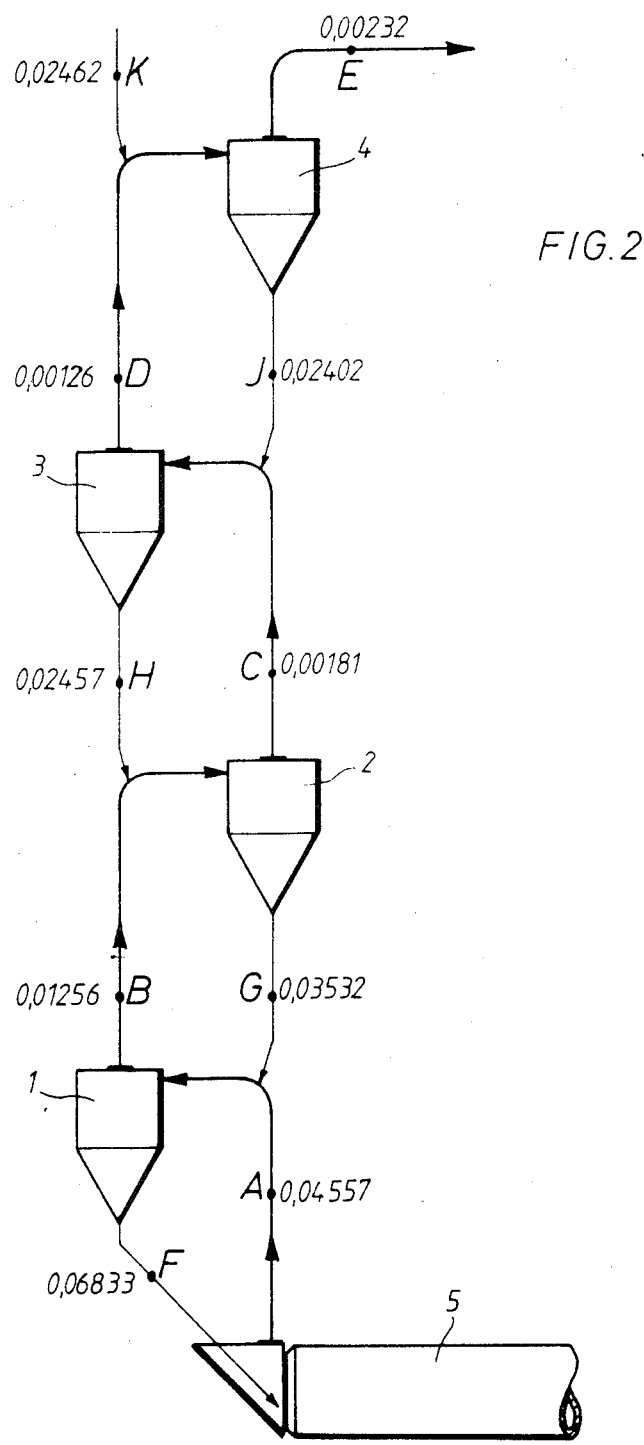

FIG. 2 illustrates the case in which raw material with organically bound sulphur is delivered to the preheater. The sulphur content (expressed in kg $SO_3$/kg clinker) determined at the individual zones of the apparatus in the gas and material stream is shown as a numerical value at the individual zones A-K on the apparatus.

By contrast with the conventional bypass at the kiln inlet (i.e., at zone A) with a heat loss of 25–35 kJ/kg clinker per 1% bypass, the invention offers two possible alternatives:

One possibility is to extract approximately 0.015 kg material/kg clinker from the material discharge duct of cyclone 1, i.e., at zone F. This results in a heat loss of only approximately 12 kJ/kg clinker.

A second possibility is to extract 0.025 kg material/kg clinker from the material discharge duct of the cyclone 2, i.e., at zone G. This results in a heat loss of approximately 16 kJ/kg clinker. This material is less deacidified than at zone F, so that a gain of approximately 2 kJ/kg clinker can be made. In addition more material is rejected at zone G than at zone F, but the material at zone G with a temperature of approximately 600° C. is considerably easier to treat than material at zone F with a temperature of approximately 760° C.

Figure 3:
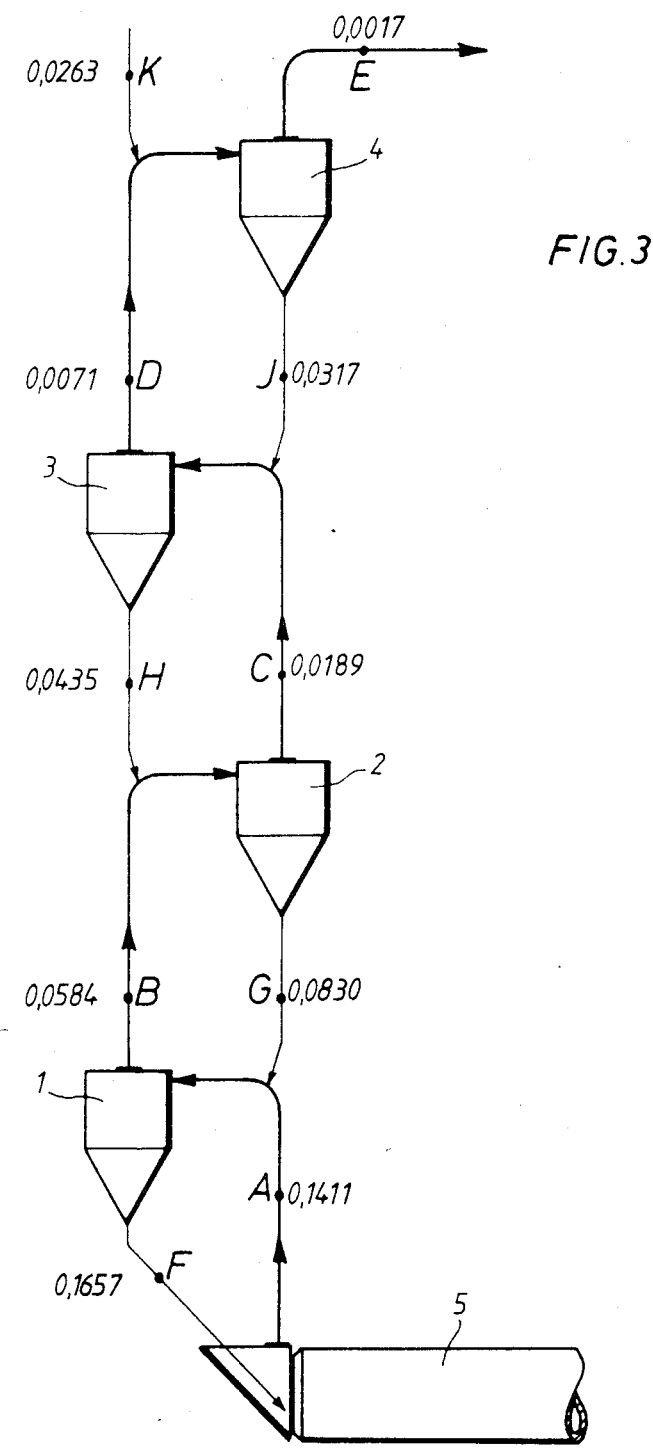

FIG. 3 illustrates the case in which cement is produced from raw material containing alkali. The numerical values shown at zones A, B, C, D, and E represent the $K_2O$ content (in kg $K_2O$/kg clinker) of the gas stream and at the zones F, G, H, I, and K the $K_2O$ content of the material. With a conventional bypass (extraction of a proportion of the kiln exhaust gas stream at zone A) 0.00141 kg $K_2O$/kg clinker per 1% bypass are extracted here.

By contrast, according to the invention the same reduction in the alkali circulation can be achieved as follows:

either by extracting 0.0193 kg material/kg clinker from zone F (heat loss approximately 15 kJ/kg clinker), or by extracting 0.0328 kg material/kg clinker from zone G (heat loss approximately 21 kJ/kg clinker).

It must be decided in each case which solution is more favorable, and it should be taken into account that in the second alternative the material is more easily treated because of the lower temperature and the lower degree of deacidification.

On the other hand, in the case of FIG. 3 a gas bypass in the preheater would be less favorable (a heat loss of approximately 48 kJ/kg clinker would occur at zone B).

Figure 4:
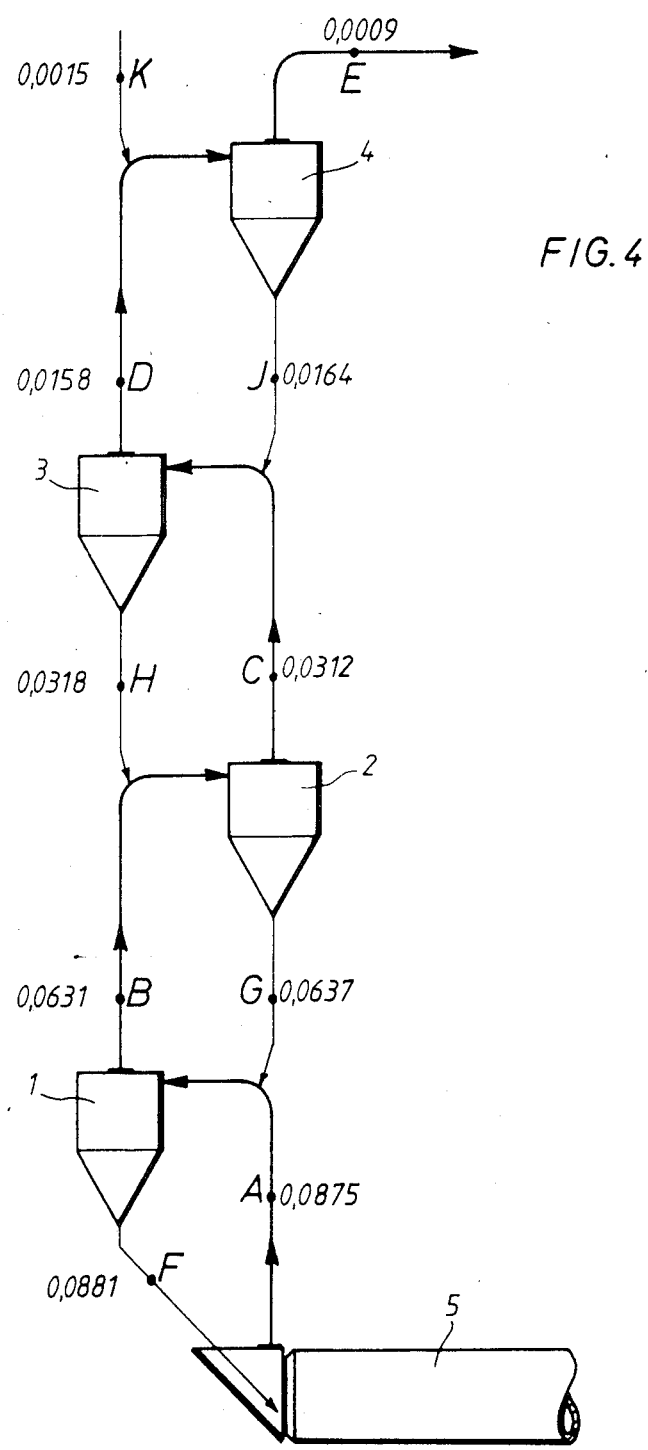

FIG. 4 illustrates a further example for the production of cement from raw material containing alkali. The numerical values represent the content of the gas or material stream in kg $K_2O$/kg clinker. With a conventional bypass at zone A 0.000875 kg $K_2O$/kg clinker per 1% bypass gas could be extracted.

In contrast to the conventional method, the invention offers the following alternatives:

First, if a gas bypass stream of 0.0188 $Nm^3$/kg clinker is extracted at zone B, then the heat losses at approximately 27 kJ/kg clinker and the material losses are lower than with the conventional bypass.

Second, if 0.0264 kg material/kg clinker is extracted from the material stream at zone G, then the heat losses at 17 kJ/kg clinker are lower than in the conventional method.

Figure 5:
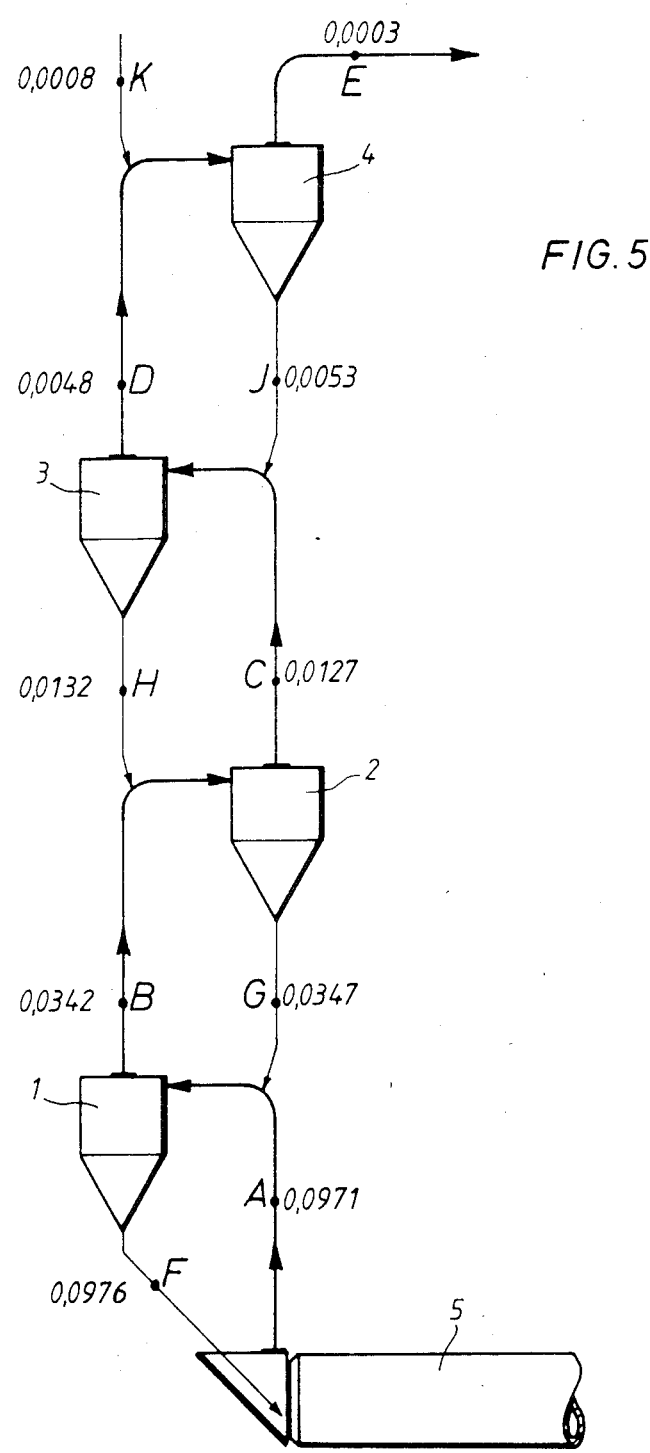

Finally, FIG. 5 illustrates the production of cement from raw material containing chlorine. The numerical values represent the chlorine content at the individual zones on the apparatus (expressed in kg Cl/kg clinker). In the conventional method of operation the chlorine circulation per 1% bypass gas is reduced at zone A by 0.00097 kg Cl/kg clinker. According to the invention this reduction is achieved:

Either by extracting 0.0225 kg material/kg clinker at zone F (heat loss 18 kJ/kg clinker), or by extracting 0.0521 kg material/kg clinker at zone G, in which case the heat loss of 33 kJ/kg clinker is comparable with the conventional extraction.

What is claimed is:

1. In a method of producing cement from raw material containing sulphur, alkali, chlorine or other harmful substance wherein such material is delivered in a stream via a multi-stage cyclone preheater to a kiln separate from said preheater and from which kiln exhaust gas flows in a stream through the preheater countercurrent to such material stream, and wherein a proportion of the material stream or the gas stream is extracted to reduce the circulation of such harmful substance, the improvement comprising extracting from the preheater a sufficient quantity of one of said streams to obtain a selected reduction in the content of said harmful substance, the extraction of said one of said streams occurring at a zone of said preheater which results in the reduction of the highest quantity of said harmful substance at the least heat loss.

2. A method according to claim 1 wherein it is a proportion of the gas stream that is extracted, and wherein said proportion of said gas stream is extracted at a zone after the lowest cyclone stage.

3. A method according to claim 1, wherein it is a proportion of the gas stream that is extracted, and wherein said proportion of said gas stream is extracted at a zone after the second lowest cyclone stage.

4. A method according to claim 1 wherein it is a proportion of the material stream that is extracted, and wherein said proportion of said material stream is extracted from a zone after the lowest cyclone stage.

5. A method according to claim 1 wherein it is a proportion of the material stream that is extracted, and wherein said proportion of said material stream is extracted from a zone after the second lowest cyclone stage.

6. In a method of producing cement from raw material containing sulphur, alkali, chlorine or other harmful substance, and wherein such material is delivered in a stream via a multi-stage cyclone preheater to a kiln from which kiln exhaust gas flows in a stream through the preheater countercurrent to the material stream, and wherein a proportion of at least one of said streams is extracted to reduce the circulation of such harmful substance, the improvement comprising determining the concentration of such harmful substance in the material stream at a plurality of zones in said preheater; determining the concentration of such harmful substance in the gas stream at said plurality of zones in said preheater; determining the temperature in said plurality of zones in said preheater; and extracting that proportion of one of said streams from that zone which results in the removal of the highest concentration of said harmful substance at the lowest heat loss.

7. A method according to claim 6 wherein it is a proportion of said gas stream that is extracted from said preheater.

8. A method according to claim 6 wherein it is a proportion of said material stream that is extracted from said preheater.

* * * * *

UNITED STATES PATENT AND TRADEMARK OFFICE
CERTIFICATE OF CORRECTION

PATENT NO. : 4,576,644
DATED : March 18, 1986
INVENTOR(S) : Wolf Goldmann

It is certified that error appears in the above-identified patent and that said Letters Patent are hereby corrected as shown below:

Column 1, line 15, after "$MgSO_4 \cdot 2H_2O$" insert -- (kieserite).--

Column 3, line 9, change "J" to -- I --.

Signed and Sealed this

Twenty-second Day of September, 1987

Attest:

DONALD J. QUIGG

Attesting Officer     Commissioner of Patents and Trademarks